(12) United States Patent
Osburn et al.

(10) Patent No.: US 8,103,427 B2
(45) Date of Patent: Jan. 24, 2012

(54) EGR FLOW COMPENSATION FOR A DIESEL AIR HANDLING SYSTEM

(75) Inventors: Andrew W. Osburn, Nashville, IN (US); Mert Geveci, Bloomington, IN (US); Richard J. Gustafson, Columbus, IN (US); Erik L. Piper, Columbus, IN (US)

(73) Assignee: Cummins Inc., Columbus, IN (US)

( * ) Notice: Subject to any disclaimer, the term of this patent is extended or adjusted under 35 U.S.C. 154(b) by 110 days.

(21) Appl. No.: 12/567,225

(22) Filed: Sep. 25, 2009

(65) Prior Publication Data

US 2011/0077838 A1     Mar. 31, 2011

(51) Int. Cl.
F02B 47/08    (2006.01)
F02M 25/07    (2006.01)
F02D 9/00     (2006.01)

(52) U.S. Cl. .................. 701/108; 123/568.21
(58) Field of Classification Search ............. 123/568.21, 123/559.1; 701/103–105, 108; 60/605.2
See application file for complete search history.

(56) References Cited

U.S. PATENT DOCUMENTS

| | | | |
|---|---|---|---|
| 6,032,656 A | 3/2000 | Itoyama et al. | |
| 6,079,387 A | 6/2000 | Mamiya et al. | |
| 6,148,616 A | 11/2000 | Yoshida et al. | |
| 6,305,167 B1 | 10/2001 | Weisman, II et al. | |
| 6,805,095 B2 | 10/2004 | Sun et al. | |
| 7,031,824 B2 | 4/2006 | Gangopadhyay | |
| 7,117,078 B1 | 10/2006 | Gangopadhyay | |
| 7,740,010 B2 * | 6/2010 | Fulton et al. ................ | 123/698 |
| 2009/0132153 A1 * | 5/2009 | Shutty et al. ................ | 701/108 |
| 2010/0242936 A1 * | 9/2010 | Zurlo et al. ................. | 123/704 |
| 2010/0268442 A1 * | 10/2010 | Kabashima et al. ......... | 701/103 |
| 2011/0010079 A1 * | 1/2011 | Shutty et al. ................ | 701/108 |

FOREIGN PATENT DOCUMENTS

| | | |
|---|---|---|
| EP | 0892165 A2 | 1/1999 |
| EP | 0 965 740 | 10/2004 |
| WO | WO 99/01652 A1 | 1/1999 |

OTHER PUBLICATIONS

International Search Report, PCT/US2010/050403, Cummins Inc., International Searching Authority/Korean Intellectual Property Office, May 3, 2011.

Written Opinion, PCT/US2010/050403, Cummins Inc., International Searching Authority/Korean Intellectual Property Office, Feb. 18, 2011.

* cited by examiner

*Primary Examiner* — Hai Huynh (74) *Attorney, Agent, or Firm* — Matthew D. Fair; J. Stephen Wills; Krieg DeVault LLP (57) ABSTRACT

A method is disclosed for adjusting a target EGR mass flow in response to a current charge flow and target EGR fraction. The method includes interpreting an air-fuel ratio and a target air-fuel ratio. The method further includes interpreting a charge flow and a target EGR fraction. The method further includes determining an adjusted target EGR mass flow based on the air-fuel ratio, the target air-fuel ratio, the charge flow, and the target EGR fraction. The method further includes controlling an actuator based on the adjusted target EGR mass flow.

23 Claims, 4 Drawing Sheets

EGR FLOW COMPENSATION FOR A DIESEL AIR HANDLING SYSTEM

TECHNICAL FIELD

The technical field generally relates to controlling gas flow for a combustion engine, and more particularly relates to controlling gas flow in an engine with exhaust gas recirculation.

BACKGROUND

An internal combustion engine with exhaust gas recirculation (EGR) flows a specified amount of EGR based on the current operating conditions. However, the EGR is often controlled with multiple coupled levers—for example with a variable geometry turbocharger (VGT) and an EGR valve. Decoupling algorithms exist that allow EGR systems to reach equilibrium at designed operating points. However, the levers may have varying response times and saturation points, causing deviation from the designed operating points during transients and even at some steady state points in certain conditions such as high altitude operation. Accordingly, there is a demand for further improvements in this area of technology.

SUMMARY

One embodiment is a unique EGR flow control technique. Other embodiments include unique methods, systems, and apparatus to control an engine air handling system. Further embodiments, forms, objects, features, advantages, aspects, and benefits shall become apparent from the following description and drawings.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated embodiments, and that such further applications of the principles of the invention as illustrated therein as would normally occur to one skilled in the art to which the invention relates are contemplated and protected.

Certain functional units described herein have been labeled as modules to more particularly emphasize their implementation independence. Modules may be implemented as instructions or logic executable by a processor and stored on a computer readable medium. For example, a module may be implemented as a hardware circuit comprising transistors, logic chips, or other discrete components configured to execute the operations of the module. In certain embodiments, a module may be implemented as instructions on a programmable hardware device. An identified module may comprise one or more physical or logical blocks of computer instructions that may reside together or in disparate locations, which, when joined logically together comprise the module and achieve the stated purpose.

Figure 1:
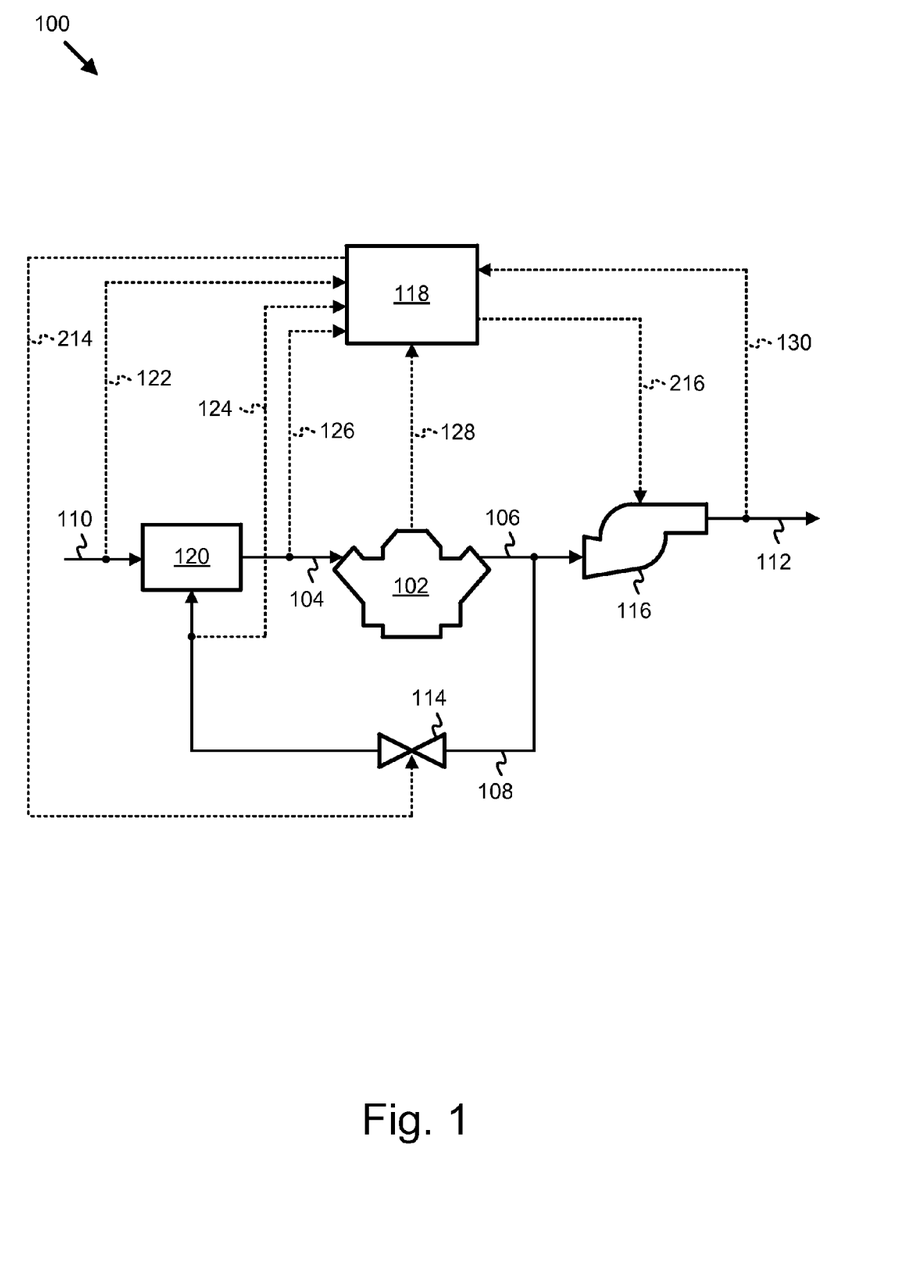
FIG. 1 is a schematic block diagram of a system for EGR flow compensation.

FIG. 1 is a schematic block diagram of a system 100 for exhaust gas recirculation (EGR) flow compensation. The system 100 includes an internal combustion engine 102 having a charge flow 104, an exhaust flow 106, and an EGR flow path 108 that mixes a portion of the exhaust flow 106 into the charge flow 104. The engine 102 may be any type of internal combustion engine compatible with an EGR flow path 108, including at least a spark ignited engine, a compression ignition engine, a diesel engine, a gasoline engine, and/or a rotary engine. The EGR flow path 108 is illustrated as being routed before a turbocharger 116 and into an intake manifold 120, but any routing of an EGR flow path 108 is contemplated within the present application, including an "in-cylinder" EGR flow path wherein some of the previous combustion event gases are trapped in a cylinder for inclusion in a subsequent combustion event.

In certain embodiments, the system 100 includes an EGR valve 114 disposed in the EGR flow path 108. As described previously, the EGR valve 114 may be an exhaust valve of the engine 102 that traps combustion gases in the combustion chamber (not shown). In certain embodiments, the turbocharger 116 may be a variable geometry turbocharger (VGT) disposed in the exhaust flow 106 and having an exit flow 112 that passes to the atmosphere potentially through aftertreatment components (not shown). In certain embodiments, the turbocharger 116 may be a controlled wastegate, swing vane VGT, sliding nozzle VGT, or any other type of configurable geometry turbocharger understood in the art.

The system 100 may further include other air handling devices, such as an intake throttle and/or an exhaust throttle (not shown). Other air handling devices that have actuators can experience saturation (either physical saturation where the device cannot move further in a particular direction, or effective saturation where a system constraint prevents the device from moving further or prevents the further movement from being effective for the controlled gaseous stream flow), and where those devices are determined to be saturated the operations described herein may detect to the saturation of the other air handling devices and control the other actuators to achieve the EGR flow target.

The charge flow 104 comprises all gases passing into the engine 102 for combustion, including gases remaining in the engine 102 from a previous combustion cycle. The charge flow 104 may be supplied by the intake manifold 120, where fresh air flow 110 combines with the EGR flow from the EGR flow path 108 to create the charge flow 104. In certain embodiments, the charge flow 104 is created in the cylinder when the fresh air flow 110 combines with remaining exhaust gases in the combustion chamber to create the charge flow 104.

The system 100 further includes a processing subsystem 118 structured to perform operations for EGR flow compensation. The processing subsystem 118 may be structured with controllers, modules, sensors, actuators, communication links, and other devices known in the art for performing the operations described herein. In certain embodiments, the processing subsystem 118 interprets information indicative of a fresh air flow rate 122, an EGR flow rate 124, a charge flow rate 126, various engine parameters 128, and an exhaust flow rate 130. In certain embodiments, the processing subsystem 118 provides EGR valve commands 214 and/or VGT commands 216. All commands and information may be provided in alternate forms, some information may not be present in certain embodiments, and additional information may be present in certain embodiments. Information may be interpreted from sensor inputs, from datalink communications, from parameters on a storage medium readable by a computer, or through other information gathering devices understood in the art. Interpreting information may include, in certain embodiments, receiving related information and calculating the interpreted information from the related information.

In certain embodiments, the processing subsystem 118 is structured to interpret a charge flow, an air-fuel ratio (AFR), a target EGR fraction, and a target AFR. In certain further embodiments, the processing subsystem 118 is further structured to determine an adjusted target EGR mass flow based on the AFR, the target AFR, the charge flow, and the target EGR fraction. In certain embodiments, the processing subsystem 118 is further structured to provide the adjusted target EGR mass flow to an air handling controller. The air handling controller may be a part of the processing subsystem 118, and in certain embodiments the air handling controller is structured to control the EGR valve 114 and the VGT 116 in response to the adjusted target EGR mass flow. In certain embodiments, the air handling controller replaces a nominal target EGR mass flow with the adjusted target EGR mass flow. In certain embodiments, the air handling controller is structured to replace the nominal target EGR mass flow with the adjusted target EGR mass flow in response to the EGR valve 114 being saturated, the VGT 116 actuator being saturated, and/or in response to the engine 102 experiencing a transient operation.

The EGR valve 114 is saturated when the actuator for the EGR valve 114 is operating at a design limit (e.g. fully open or fully closed) and the processing subsystem 118 has a target value for the EGR valve 114 that is beyond the design limit. The EGR valve 114 is also saturated if the processing subsystem 118 has a target value that would be beyond the design limit if the processing subsystem 118 did not limit the EGR valve 114 actuator command. The EGR valve 114 actuator is also saturated if a system constraint prevents the EGR valve 114 from further opening or closing even if the EGR valve 114 has operating room to open or close further, for example further closing (or opening) may be limited by emissions compliance, condensation considerations, pressure limitations, diagnostic tolerances, or other considerations. The EGR valve 114 actuator is also saturated if the EGR valve 114 response is saturated, for example if the EGR valve 114 is only partially open but the flow through the EGR valve 114 is not increasing (or only nominally increasing) as the EGR valve 114 opens (a common situation at relatively high valve opening positions in for poppet valve, for example), then the EGR valve 114 is saturated.

The VGT 116 actuator is saturated when the actuator is operating at a design limit (e.g. fully open or fully closed) and the processing subsystem 118 has a target value for the VGT 116 actuator that is beyond the design limit. The VGT 116 actuator is also saturated if the processing subsystem 118 has a target value that would be beyond the design limit if the processing subsystem 118 did not limit the VGT 116 actuator command. The VGT 116 actuator is also saturated if a system constraint prevents the VGT 116 from further opening or closing even if the VGT 116 has operating room to open or close further, for example further closing (or opening) may be limited by pressure constraints, diagnostic tolerances, minimum acceptable efficiency limitations, or other considerations. In the example, the VGT 116 actuator is saturated and the processing subsystem 118, in certain embodiments, replaces the nominal target EGR mass flow with the adjusted target EGR mass flow.

The engine 102 experiences a transient operation when a characteristic of the engine 102 is changing above a threshold change rate. In certain embodiments, the engine 102 load and/or speed may be changing to indicate transient operation of the engine. In certain embodiments, the processing subsystem 118 may detect other parameters indicating a transient operation, for example a rapid change in an accelerator pedal position that has not yet been reflected in an engine 102 speed or load change. In certain embodiments, a data value may be interpreted to determine whether the engine 102 is in a transient operation—for example an Alpha parameter indicating steady-state versus transient operation, a parameter indicating that the engine 102 is experiencing a new operating mode, and/or a parameter indicating that an aftertreatment component is requesting a special operating mode such as a regeneration mode. Any descriptions or interpretations of engine 102 transient operation understood in the art are contemplated within the present application.

Figure 2:
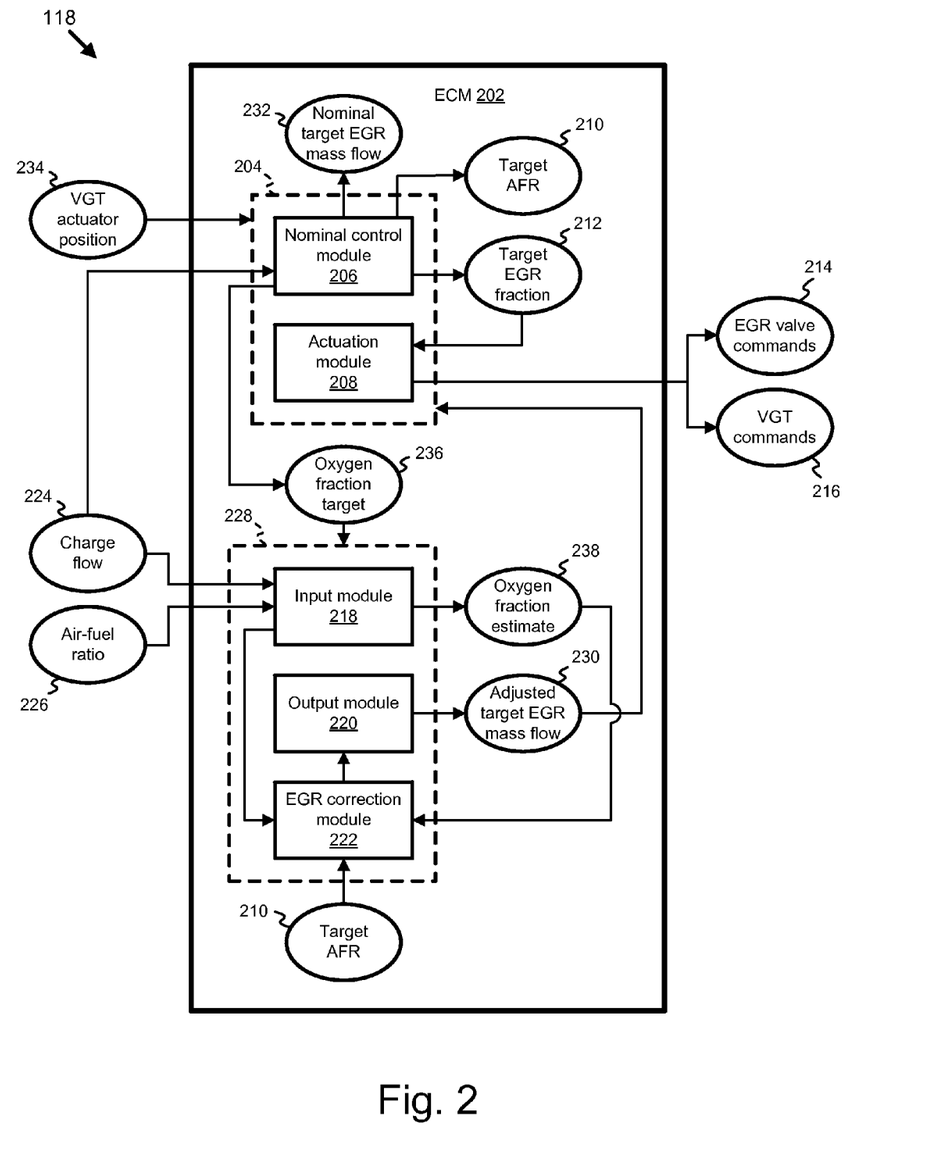
FIG. 2 is a schematic block diagram of a processing subsystem for EGR flow compensation.

FIG. 2 is a schematic block diagram of a processing subsystem 118 for EGR flow compensation. In certain embodiments, the processing subsystem 118 includes an engine control module (ECM) 202 that performs some of the operations of the processing subsystem 118. The ECM 202 includes an air handling controller 204 and an EGR adjustment controller 228. In certain embodiments, the air handling controller 204 includes a nominal control module 206 that provides a target AFR 210 and a target EGR fraction 212. The target AFR 210 and target EGR fraction 212 may be derived from current performance and emissions requirements of the engine 102 as understood in the art. In certain embodiments, the air handling controller 204 further includes an actuation module 208 that provides EGR valve commands 214 and VGT commands 216 to operate the EGR valve 114 and the VGT 116 in response to the target AFR 210 and the target EGR fraction 212.

In certain embodiments, the EGR adjustment controller 228 includes an input module 218 that interprets a charge flow 224 and an AFR 226. The EGR adjustment controller 228 further includes an EGR correction module 222 that determines an adjusted target EGR mass flow based on the AFR 226, the target AFR 210, the charge flow 224, and the target EGR fraction 212. The EGR adjustment controller 228 further includes an output module 220 that provides the adjusted target EGR mass flow 230 to the air handling controller 204. In certain embodiments, the nominal control module 206 determines a nominal target EGR mass flow 232, for example based on the target EGR flow 212 and the charge flow 224. In certain further embodiments, the nominal control module 206 replaces the nominal target EGR flow 232 with the adjusted target EGR mass flow 230. In certain further embodiments, the nominal control module 206 replaces the nominal target EGR flow 232 with the adjusted target EGR mass flow 230 in response to a VGT 116 actuator being saturated and/or in response to the engine 102 experiencing a transient operation.

In certain embodiments, the nominal control module 206 interprets an oxygen fraction target 236, for example based on an engine 102 performance and/or emissions target. In certain further embodiments, the input module 218 determines an oxygen fraction target 238, for example of the charge flow 224, according to the equation:

$$Y_{O_2} = C_0 + C_1 \frac{Y_{EGR}}{1 + A/F_{actual}}. \quad \text{Equation 1}$$

In equation 1, $Y_{O_2}$ is the oxygen fraction estimate, $C_0$ is an atmospheric oxygen mass fraction, $Y_{EGR}$ comprises the EGR fraction, wherein $A/F_{actual}$ comprises the AFR 226, and $C_1$ comprises an oxygen depletion term based on a combusted fuel oxygen consumption. The $C_0$ term is about 0.232 in the standard atmosphere ignoring humidity, which may be accommodated in a system 100 where humidity detection is available. For example, where humidity is about 5% by mass, the $C_0$ term is about 0.226. The $C_1$ term accounts for the depletion of oxygen in the recycled gas from the EGR stream 108. Values applicable for $C_1$ depend upon the composition of the fuel, whether combustion is complete, and the like, but a value of about −3.6 for diesel fuel to about −4.2 for natural gas typically provides acceptable results. The EGR fraction may be defined as $$\frac{EGR}{Charge}, \frac{EGR}{EGR + Intake},$$

or by any other method understood in the art. The AFR 226 may be defined as the mass of intake air 110 per unit mass of fuel injected in the engine 102, where an AFR 226 value near 14.5 is typically stoichiometric for diesel fuel, and an AFR 226 value near 17.3 is typically stoichiometric for natural gas fuel.

In certain embodiments, the EGR correction module 222 determines an adjusted target EGR mass flow 230 based on the AFR 226, the charge flow 224 by utilizing the relationship in Equation 1 to target an EGR flow 108 fraction that achieves the oxygen fraction target 236.

Equation 1 may be further utilized to create control parameters supporting an oxygen fraction target 236 as follows. Equation 2 illustrates the oxygen fraction estimate of Equation 1, setting the achieved fraction equal to the target (reference) fraction.

$$Y_{O_2} = C_0 + C_1 \frac{Y_{EGR}}{1 + A/F_{actual}} = C_0 + C_1 \frac{Y_{EGR_{reference}}}{1 + A/F_{reference}}. \quad \text{Equation 2}$$

The reference EGR fraction may be assumed to be equal to $$\frac{\dot{m}_{EGR,ref}}{\dot{m}_{charge}}$$

if system time lags, fluid compressibility, and similar system 100 characteristics are ignored as an approximation. By substituting for the reference EGR fraction, dropping common terms, and solving for the EGR mass flow, an adjusted target EGR flow 230 is developed as shown in Equation 3.

$$\dot{m}_{EGR,ref} = Y_{EGR,ref} \dot{m}_{charge} \frac{\lfloor 1 + A/F_{actual} \rfloor}{[1 + A/F_{ref}]}. \quad \text{Equation 3}$$

In Equation 3, the term $m_{EGR,ref}$ is the mass flow of EGR, or the adjusted target EGR flow 230. In certain embodiments, the charge flow 224 and the air-fuel ratio 226 have a relatively slow response time, while the EGR mass flow has a relatively fast response time, such that operation under the principles of Equation 3 allows the air handling controller 204 to more closely match the oxygen fraction target 236 during transient operation.

Figure 3:
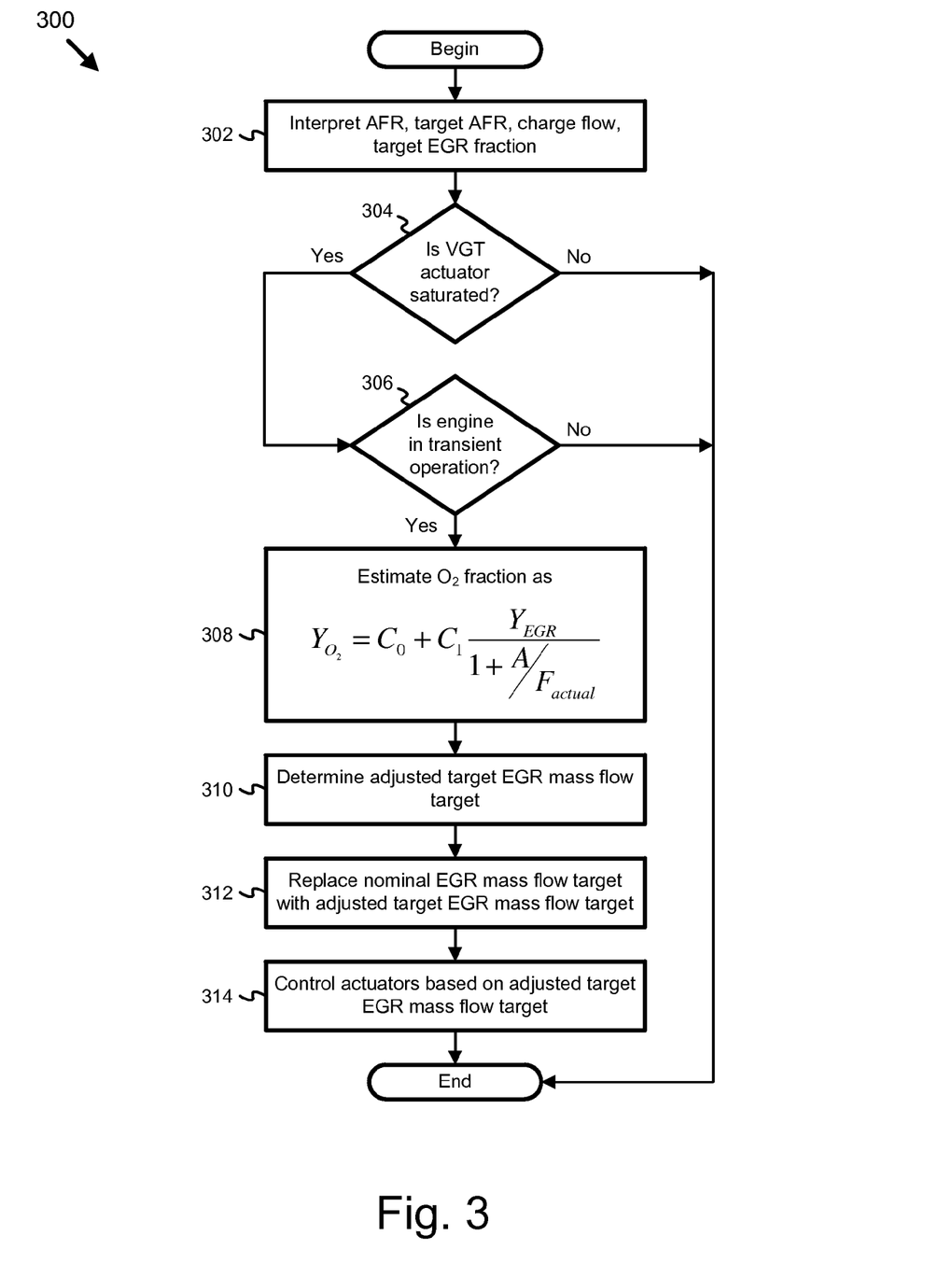
FIG. 3 is a schematic flow diagram of a technique for EGR flow compensation.

FIG. 3 is a schematic flow diagram of a technique 300 for EGR flow compensation. The technique includes operations 302 to interpret an air-fuel ratio and a target air-fuel ratio, and operations to interpret a charge flow and a target EGR fraction. In certain embodiments, the technique 300 includes operations 304 to determine whether a VGT 116 actuator is saturated, and ending the technique 300 if the VGT 116 actuator is not saturated. In certain embodiments, if the VGT 116 actuator is saturated, the technique 300 includes operations 306 to determine if an engine 102 is in transient operation, and ending the technique 300 if the engine 102 is not in transient operation. In certain embodiments, if the engine 102 is in transient operation, the technique 300 includes operations 308 to estimate an oxygen fraction as $$Y_{O_2} = C_0 + C_1 \frac{Y_{EGR}}{1 + A/F_{actual}}.$$

In certain embodiments, the technique further includes operations 310 to determine an adjusted target EGR mass flow based on the air-fuel ratio, the target air-fuel ratio, the charge flow, and the target EGR fraction. In certain embodiments, the technique 300 further includes operations 312 to replace a nominal target EGR mass flow 232 with the adjusted target EGR mass flow 230. The technique 300 further includes operations 314 to control an actuator(s) based on the adjusted target EGR mass flow 230. The actuator includes at least one of an EGR valve actuator and a variable geometry turbocharger (VGT) actuator. The operations 310 to determine the adjusted target EGR mass flow may include the equation $$\dot{m}_{EGR,ref} = Y_{EGR,ref} \dot{m}_{charge} \frac{\lfloor 1 + A/F_{actual} \rfloor}{[1 + A/F_{ref}]}.$$

Certain operations of FIG. 3 may be omitted in whole or part, certain operations not shown in FIG. 3 may be added, and operations may be performed in a different order or performed in an alternate manner.

Figure 4:
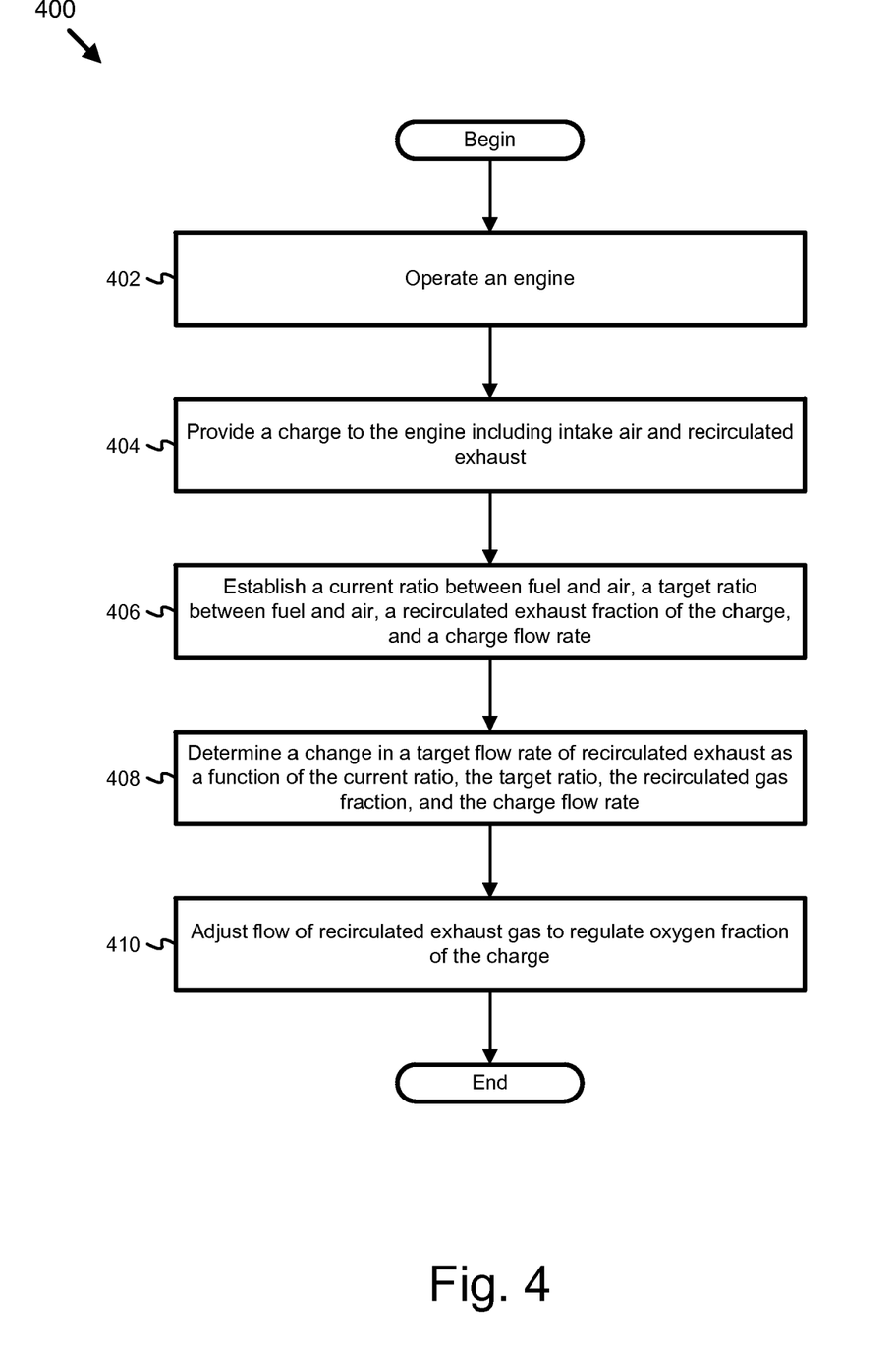
FIG. 4 is a schematic flow diagram of a procedure for EGR flow compensation.

FIG. 4 is a schematic flow diagram of a procedure 400 for EGR flow compensation. The procedure 400 includes procedures 402 to operate an internal combustion engine including an intake manifold and an EGR device in fluid communication with the intake manifold. The procedure 400 further includes operations 404 to provide a charge to the internal combustion engine from the intake manifold, the charge including intake air and recirculated exhaust gas from the EGR device. The procedure 400 further includes operations 406 to establish a current ratio between fuel and air, a target ratio between fuel and air, a recirculated exhaust gas fraction of the charge, and a charge flow rate. The procedure 400 further includes operations 408 to determine a change in a target flow rate of the recirculated exhaust gas as a function of the current ratio, the target ratio, the recirculated exhaust gas fraction, and the charge flow rate. The procedure 400 further includes operations 410 which, in response to the change in the target flow rate, adjust the flow of the recirculated exhaust gas with the EGR device to regulate oxygen fraction of the charge.

Certain operations of FIG. 4 may be omitted in whole or part, certain operations not shown in FIG. 4 may be added, and operations may be performed in a different order or performed in an alternate manner.

As is evident from the figures and text presented above, a variety of embodiments according to the present invention are contemplated. Certain exemplary embodiments include a system, method, and apparatus for providing EGR flow compensation.

One exemplary embodiment includes an apparatus having an internal combustion engine including an intake manifold and an exhaust gas recirculation (EGR) device in fluid communication with the intake manifold, and a processing subsystem. In certain embodiments, the processing subsystem is structured to interpret a charge flow and an air-fuel ratio, interpret a target exhaust gas recirculation (EGR) fraction and a target air-fuel ratio, and determine an adjusted target EGR mass flow based on the air-fuel ratio, the target air-fuel ratio, the charge flow, and the target EGR fraction. The processing subsystem is further structured to provide the adjusted target EGR mass flow to an air handling controller.

In certain further embodiments, the air handling controller is structured to control an EGR valve and a variable geometry turbocharger (VGT) in response to the adjusted target EGR mass flow, and/or to replace a nominal target EGR mass flow with the adjusted target EGR mass flow. In certain further embodiments, the processing subsystem is further structured to determine the adjusted target EGR mass flow according to the equation:

$$\dot{m}_{EGR,ref} = Y_{EGR,ref} \dot{m}_{charge} \frac{\lfloor 1 + A/F_{actual} \rfloor}{[1 + A/F_{ref}]}.$$

In certain further embodiments, the processing subsystem is further structured to interpret an oxygen fraction target and to estimate an oxygen fraction according to the equation:

$$Y_{O_2} = C_0 + C_1 \frac{Y_{EGR}}{1 + A/F_{actual}}.$$

In certain further embodiments, the air handling controller is structured to replace a nominal target EGR mass flow with the adjusted target EGR mass flow in response to a variable geometry turbocharger (VGT) actuator being saturated, and/or in response to the internal combustion engine experiencing a transient operation.

One exemplary embodiment includes a method including operations of interpreting an air-fuel ratio and a target air-fuel ratio, interpreting a charge flow and a target EGR fraction, determining an adjusted target EGR mass flow based on the air-fuel ratio, the target air-fuel ratio, the charge flow, and the target EGR fraction, and controlling at least one actuator based on the adjusted target EGR mass flow. In certain further embodiments of the method, the at least one actuator includes an EGR valve actuator and a variable geometry turbocharger (VGT) actuator, and determining the adjusted target EGR mass flow is performed in response to the VGT actuator being saturated and/or the engine experiencing a transient operation.

In certain further embodiments, the operation to determine the adjusted target EGR mass flow is performed according to the equation $$\dot{m}_{EGR,ref} = Y_{EGR,ref} \dot{m}_{charge} \frac{\lfloor 1 + A/F_{actual} \rfloor}{[1 + A/F_{ref}]}.$$

In certain further embodiments, an operation is performed to interpret a target oxygen fraction, and estimate an oxygen fraction according to the equation $$Y_{O_2} = C_0 + C_1 \frac{Y_{EGR}}{1 + A/F_{actual}}.$$

In certain further embodiments, an operation is performed to provide the adjusted target EGR mass flow to an air handling controller. In certain further embodiments, an operation is performed to replace a nominal target EGR mass flow with the adjusted target EGR mass flow.

In certain exemplary embodiments, a system includes an internal combustion engine having a charge flow, an exhaust flow, an exhaust gas recirculation (EGR) flow path adapted to mix a portion of the exhaust flow into the charge flow, an EGR valve disposed in the EGR flow path, a variable geometry turbocharger (VGT) disposed in the exhaust flow, and a processing subsystem. In certain embodiments, the processing subsystem includes an air handling controller and an EGR adjustment controller. In certain further embodiments, the air handling controller includes a nominal control module configured to provide a target air-fuel ratio (AFR) and a target EGR fraction, and an actuation module configured to operate the EGR valve and the VGT in response to the target AFR and target EGR fraction. In certain further embodiments, the EGR adjustment controller includes an input module configured to interpret a charge flow and an air-fuel ratio, an EGR correction module configured to determine an adjusted target EGR mass flow based on the air-fuel ratio, the target AFR, the charge flow, and the target EGR fraction, and an output module configured to provide the adjusted target EGR mass flow to the air handling controller.

In certain further embodiments, the air handling controller is structured to replace a nominal target EGR mass flow with the adjusted target EGR mass flow. In certain further embodiments, the VGT includes a VGT actuator, and the air handling controller is further structured to replace the nominal target EGR mass flow with the adjusted target EGR mass flow in response to the VGT actuator being saturated. In certain further embodiments, the EGR correction module is further configured to determine the adjusted target EGR mass flow according to the equation $$\dot{m}_{EGR,ref} = Y_{EGR,ref} \dot{m}_{charge} \frac{\lfloor 1 + A/F_{actual} \rfloor}{[1 + A/F_{ref}]}.$$

In certain further embodiments, the nominal control module is further configured to interpret an oxygen fraction target, and wherein the input module is further configured to estimate an oxygen fraction according to the equation $$Y_{O_2} = C_0 + C_1 \frac{Y_{EGR}}{1 + A/F_{actual}}.$$

In certain exemplary embodiments, a procedure includes operating an internal combustion engine including an intake manifold and an EGR device in fluid communication with the intake manifold, providing a charge to the internal combustion engine from the intake manifold, the charge including intake air and recirculated exhaust gas from the EGR device, establishing a current ratio between fuel and air, a target ratio between fuel and air, a recirculated exhaust gas fraction of the charge, and a charge flow rate, and determining a change in a target flow rate of the recirculated exhaust gas as a function of the current ratio, the target ratio, the recirculated exhaust gas fraction, and the charge flow rate. The procedure further includes, in response to the change in the target flow rate, adjusting flow of the recirculated exhaust gas with the EGR device to regulate oxygen fraction of the charge. In certain further embodiments, the operation of determining the change in the target flow rate is performed according to the equation $$\dot{m}_{EGR,ref} = Y_{EGR,ref} \dot{m}_{charge} \frac{\lfloor 1 + A/F_{actual} \rfloor}{[1 + A/F_{ref}]}.$$

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:
    an internal combustion engine including an intake manifold and an exhaust gas recirculation (EGR) device in fluid communication with the intake manifold;
    a processing subsystem structured to:
    interpret a charge flow and an air-fuel ratio;
    interpret a target exhaust gas recirculation (EGR) fraction and a target air-fuel ratio;
    determine an adjusted target EGR mass flow based on the air-fuel ratio, the target air-fuel ratio, the charge flow, and the target EGR fraction; and
    provide the adjusted target EGR mass flow to an air handling controller.
2. The apparatus of claim 1, wherein the air handling controller is structured to control an EGR valve and a variable geometry turbocharger (VGT) in response to the adjusted target EGR mass flow.
3. The apparatus of claim 1, wherein the air handling controller is structured to replace a nominal target EGR mass flow with the adjusted target EGR mass flow.
4. The apparatus of claim 3, wherein the air handling controller is structured to replace a nominal target EGR mass flow with the adjusted target EGR mass flow in response to one of an EGR valve actuator and a VGT actuator being saturated.
5. The apparatus of claim 3, wherein the air handling controller is structured to replace a nominal target EGR mass flow with the adjusted target EGR mass flow in response to the internal combustion engine experiencing a transient operation.
6. The apparatus of claim 1, wherein the processing subsystem is further structured to determine the adjusted target EGR mass flow according to the equation:

$$\dot{m}_{EGR,ref} = Y_{EGR,ref} \dot{m}_{charge} \frac{\lfloor 1 + A/F_{actual} \rfloor}{[1 + A/F_{ref}]},$$

wherein $m_{EGR,ref}$ is the adjusted target EGR mass flow, wherein $Y_{EGR,ref}$ is the target EGR fraction, wherein $m_{charge}$ is the charge flow, wherein $\lfloor A/F_{actual} \rfloor$ is the air-fuel ratio, and wherein $[A/F_{ref}]$ is the target air-fuel ratio.

7. The apparatus of claim 1, wherein the processing subsystem is further structured to interpret an oxygen fraction target and to estimate an oxygen fraction according to the equation:

$$Y_{O_2} = C_0 + C_1 \frac{Y_{EGR}}{1 + A/F_{actual}},$$

wherein $Y_{O_2}$ comprises the oxygen fraction, wherein $C_0$ comprises an atmospheric oxygen mass fraction, wherein $Y_{EGR}$ comprises an EGR fraction, wherein $A/F_{actual}$ comprises the air-fuel ratio, and wherein $C_1$ comprises an oxygen depletion term based on a combusted fuel oxygen consumption.

8. The apparatus of claim 7, wherein the processing subsystem is further structured to determine the adjusted target EGR mass flow target according to the equation:

$$\dot{m}_{EGR,ref} = Y_{EGR,ref} \dot{m}_{charge} \frac{\lfloor 1 + A/F_{actual} \rfloor}{[1 + A/F_{ref}]},$$

wherein $m_{EGR,ref}$ is the adjusted target EGR mass flow, wherein $Y_{EGR,ref}$ is the target EGR fraction, wherein $m_{charge}$ is the charge flow, and wherein $[A/F_{ref}]$ is the target air-fuel ratio.

9. A method, comprising:
    interpreting an air-fuel ratio and a target air-fuel ratio;
    interpreting a charge flow and a target EGR fraction;
    determining an adjusted target EGR mass flow based on the air-fuel ratio, the target air-fuel ratio, the charge flow, and the target EGR fraction; and
    controlling at least one actuator based on the adjusted target EGR mass flow.

10. The method of claim 9, wherein the at least one actuator comprises an EGR valve actuator and a variable geometry turbocharger (VGT) actuator, wherein the adjusted target EGR mass flow is determined in response to the VGT actuator being saturated.

11. The method of claim 9, wherein the adjusted target EGR mass flow is determined according to the equation:

$$\dot{m}_{EGR,ref} = Y_{EGR,ref}\dot{m}_{charge}\frac{\lfloor 1 + A/F_{actual}\rfloor}{[1 + A/F_{ref}]},$$

wherein $m_{EGR,ref}$ is the adjusted target EGR mass flow, wherein $Y_{EGR,ref}$ is the EGR fraction, wherein $m_{charge}$ is the charge flow, wherein $\lfloor A/F_{actual}\rfloor$ is the air-fuel ratio, and wherein $[A/F_{ref}]$ is the target air-fuel ratio.

12. The method of claim 9, further comprising providing the adjusted target EGR mass flow to an air handling controller.

13. The method of claim 12, further comprising replacing a nominal target EGR mass flow with the adjusted target EGR mass flow.

14. The method of claim 9, further comprising interpreting a target oxygen fraction, and estimating an oxygen fraction according to the equation:

$$Y_{O_2} = C_0 + C_1 \frac{Y_{EGR}}{1 + A/F_{actual}},$$

wherein $Y_{O_2}$ comprises the oxygen fraction, wherein $C_0$ comprises an atmospheric oxygen mass fraction, wherein $Y_{EGR}$ comprises an EGR fraction, wherein $A/F_{actual}$ comprises the air-fuel ratio, and wherein $C_1$ comprises an oxygen depletion term based on a combusted fuel oxygen consumption.

15. The method of claim 14, wherein the adjusted target EGR mass flow is determined according to the equation:

$$\dot{m}_{EGR,ref} = Y_{EGR,ref}\dot{m}_{charge}\frac{\lfloor 1 + A/F_{actual}\rfloor}{[1 + A/F_{ref}]},$$

wherein $m_{EGR,ref}$ is the adjusted target EGR mass flow, wherein $Y_{EGR,ref}$ is the EGR fraction, wherein $m_{charge}$ is the charge flow, and wherein $[A/F_{ref}]$ is the target air-fuel ratio.

16. A system, comprising:
an internal combustion engine having a charge flow, an exhaust flow, an exhaust gas recirculation (EGR) flow path adapted to mix a portion of the exhaust flow into the charge flow;
an EGR valve disposed in the EGR flow path;
a variable geometry turbocharger (VGT) disposed in the exhaust flow;
a processing subsystem comprising:
an air handling controller comprising a nominal control module configured to provide a target air-fuel ratio (AFR) and a target EGR fraction, and an actuation module configured to operate the EGR valve and the VGT in response to the target AFR and target EGR fraction; and
an EGR adjustment controller comprising an input module configured to interpret a charge flow and an air-fuel ratio, an EGR correction module configured to determine an adjusted target EGR mass flow based on the air-fuel ratio, the target AFR, the charge flow, and the target EGR fraction, and an output module configured to provide the adjusted target EGR mass flow to the air handling controller.

17. The system of claim 16, wherein the air handling controller is structured to replace a nominal target EGR mass flow with the adjusted target EGR mass flow.

18. The system of claim 17, wherein the VGT includes a VGT actuator, wherein the air handling controller is further structured to replace the nominal target EGR mass flow with the adjusted target EGR mass flow in response to the VGT actuator being saturated.

19. The system of claim 16, wherein the EGR correction module is further configured to determine the adjusted target EGR mass flow according to the equation:

$$\dot{m}_{EGR,ref} = Y_{EGR,ref}\dot{m}_{charge}\frac{\lfloor 1 + A/F_{actual}\rfloor}{[1 + A/F_{ref}]},$$

wherein $m_{EGR,ref}$ is the adjusted target EGR mass flow, wherein $Y_{EGR,ref}$ is the EGR fraction, wherein $m_{charge}$ is the charge flow, and wherein $[A/F_{ref}]$ is the target air-fuel ratio.

20. The system of claim 16, wherein the nominal control module is further configured to interpret an oxygen fraction target, and wherein the input module is further configured to estimate an oxygen fraction according to the equation:

$$Y_{O_2} = C_0 + C_1 \frac{Y_{EGR}}{1 + A/F_{actual}},$$

wherein $Y_{O_2}$ comprises the oxygen fraction, wherein $C_0$ comprises an atmospheric oxygen mass fraction, wherein $Y_{EGR}$ comprises an EGR fraction, wherein $A/F_{actual}$ comprises the air-fuel ratio, and wherein $C_1$ comprises an oxygen depletion term based on a combusted fuel oxygen consumption.

21. The system of claim 20, wherein the EGR correction module is further configured to determine the adjusted target EGR mass flow according to the equation:

$$\dot{m}_{EGR,ref} = Y_{EGR,ref}\dot{m}_{charge}\frac{\lfloor 1 + A/F_{actual}\rfloor}{[1 + A/F_{ref}]},$$

wherein $m_{EGR,ref}$ is the target EGR mass flow, wherein $Y_{EGR,ref}$ is the target EGR fraction, wherein $m_{charge}$ is the charge flow, and wherein $[A/F_{ref}]$ is the target air-fuel ratio.

22. A method, comprising:
operating an internal combustion engine including an intake manifold and an EGR device in fluid communication with the intake manifold;
providing a charge to the internal combustion engine from the intake manifold, the charge including intake air and recirculated exhaust gas from the EGR device;
establishing a current ratio between fuel and air, a target ratio between fuel and air, a recirculated exhaust gas fraction of the charge, and a charge flow rate; and
determining a change in a target flow rate of the recirculated exhaust gas as a function of the current ratio, the target ratio, the recirculated exhaust gas fraction, and the charge flow rate; and
in response to the change in the target flow rate, adjusting flow of the recirculated exhaust gas with the EGR device to regulate oxygen fraction of the charge.

23. The method of claim 22, wherein the change in a target flow rate of the recirculated exhaust gas is determined according to the equation:

$$\dot{m}_{EGR,ref} = Y_{EGR,ref} \dot{m}_{charge} \frac{\lfloor 1 + A/F_{actual} \rfloor}{[1 + A/F_{ref}]},$$

wherein $m_{EGR,ref}$ is the changed target flow rate of the recirculated exhaust gas, wherein $Y_{EGR,ref}$ is the EGR fraction, wherein $m_{charge}$ is the charge flow, wherein $\lfloor A/F_{actual} \rfloor$ is the current ratio between fuel and air, and wherein $[A/F_{ref}]$ is the target ratio between fuel and air.

* * * * *